(12) United States Patent
Kimura et al.

(10) Patent No.: US 10,009,533 B2
(45) Date of Patent: Jun. 26, 2018

(54) IMAGE PICKUP APPARATUS AND CONTROL METHOD THEREOF WITH CONTRAST FOCUS EVALUATION

(75) Inventors: Masafumi Kimura, Kawasaki (JP); Koichi Fukuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 14/232,419

(22) PCT Filed: Jul. 24, 2012

(86) PCT No.: PCT/JP2012/069275
§ 371 (c)(1),
(2), (4) Date: Jan. 13, 2014

(87) PCT Pub. No.: WO2013/015436
PCT Pub. Date: Jan. 31, 2013

(65) Prior Publication Data
US 2014/0192220 A1 Jul. 10, 2014

(30) Foreign Application Priority Data

Jul. 25, 2011 (JP) ................................ 2011-162090

(51) Int. Cl.
*G03B 13/00* (2006.01)
*H04N 5/232* (2006.01)
(Continued)

(52) U.S. Cl.
CPC ......... *H04N 5/23212* (2013.01); *G02B 7/285* (2013.01); *G02B 7/34* (2013.01); *G02B 7/36* (2013.01); *G03B 13/36* (2013.01)

(58) Field of Classification Search
CPC .......... H04N 5/23212; H04N 5/23293; H04N 5/23219; G03B 13/36; G02B 7/102
(Continued)

(56) References Cited

U.S. PATENT DOCUMENTS 5,572,011 A 11/1996 Goto
7,732,744 B2 6/2010 Utagawa
(Continued)

FOREIGN PATENT DOCUMENTS

CN 102111542 A 6/2011
EP 2028843 A2 2/2009
(Continued)

OTHER PUBLICATIONS

U.S. Appl. No. 14/279,790, filed May 16, 2014.
(Continued)

*Primary Examiner* — Sinh Tran
*Assistant Examiner* — Selam Gebriel
(74) *Attorney, Agent, or Firm* — Fitzpatrick, Cella, Harper & Scinto

(57) ABSTRACT

An image pickup apparatus for simultaneously realizing a phase difference AF and a contrast AF decides a shift amount of an image signal corresponding to a focus evaluation position every exit pupil area, generates an image corresponding to an image plane position by executing an arithmetic operation processing based on the decided shift amount to the image signal, calculates an evaluation value of a contrast of the generated image, and calculates an evaluation value of a correlation between the images corresponding to the different exit pupil areas in the generated image.

13 Claims, 17 Drawing Sheets

(51) Int. Cl.
   *G02B 7/34* (2006.01)
   *G02B 7/36* (2006.01)
   *G03B 13/36* (2006.01)
   *G02B 7/28* (2006.01)

(58) Field of Classification Search
   USPC .................................................. 348/345–357
   See application file for complete search history.

(56) References Cited

U.S. PATENT DOCUMENTS

| | | | |
|---|---|---|---|
| 8,619,180 B2 | 12/2013 | Kimura | |
| 8,634,015 B2 | 1/2014 | Kimura | |
| 8,670,047 B2 | 3/2014 | Ando et al. | |
| 2005/0185086 A1* | 8/2005 | Onozawa | 348/349 |
| 2008/0259202 A1* | 10/2008 | Fujii | 348/345 |
| 2011/0091192 A1* | 4/2011 | Iwane | G02B 7/34 396/113 |
| 2011/0110420 A1* | 5/2011 | Liang | H04N 19/119 375/240.03 |
| 2011/0134310 A1* | 6/2011 | Kimura | G02B 7/28 348/345 |
| 2011/0157423 A1 | 6/2011 | Ando et al. | |
| 2013/0113987 A1 | 5/2013 | Fukuda | |

FOREIGN PATENT DOCUMENTS

| | | |
|---|---|---|
| JP | 7-199052 A | 8/1995 |
| JP | 2006-171144 A | 6/2006 |
| JP | 2007-004471 A | 1/2007 |
| JP | 2008-134390 A | 6/2008 |
| JP | 2009-258610 A | 11/2009 |
| JP | 2010-026178 A | 2/2010 |
| JP | 2011-023812 A | 2/2011 |
| JP | 2011-139282 A | 7/2011 |

OTHER PUBLICATIONS

U.S. Appl. No. 14/263,095, filed Apr. 28, 2014.
U.S. Appl. No. 14/131,229, filed Jan. 7, 2014.
Office Action dated Jun. 3, 2015, in Chinese Patent Application No. 201280037010.1.
Office Action dated Apr. 21, 2015, in Russian Patent Application No. 2014106856.
Office Action dated Jul. 9, 2015, in Japanese Patent Application No. 2011-162090.
Office Action dated Nov. 19, 2015, in Russian Patent Application No. 2014106856/28.
Office Action dated Jun. 15, 2017, in Great Britain Patent Application No. 1400661.3.
Office Action dated Feb. 9, 2016, in Japanese Patent Application No. 2011-162090.

\* cited by examiner

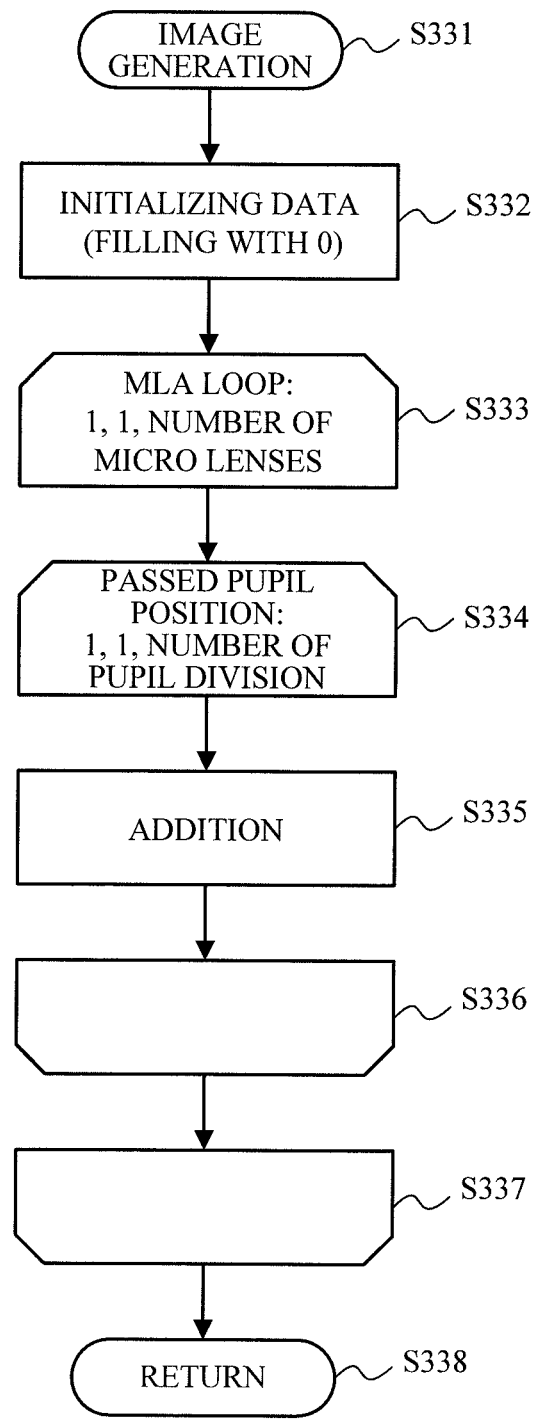

IMAGE PICKUP APPARATUS AND CONTROL METHOD THEREOF WITH CONTRAST FOCUS EVALUATION

TECHNICAL FIELD

The invention relates to an image pickup apparatus having an image pickup element for photoelectrically converting an object image and a control method of such an apparatus and, more particularly, to a control apparatus and method of autofocus (hereinbelow, referred to as AF) based on a photoelectrically-converted signal which is output from the image pickup element.

BACKGROUND ART

In the related art, as autofocus control for a focus adjustment in a digital camera or the like, for example, there are mainly phase difference AF control which is used in a digital single lens reflex camera and contrast AF control which is used in a compact camera or the like. It is a feature of those AF control that, for example, in the phase difference AF, a high-speed focus adjustment can be attained and, in the contrast AF, an exact focus adjustment can be attained.

For example, Patent Literature 1 discloses a method of performing a contrast evaluation on the basis of a signal of a phase difference AF sensor. Patent Literature 2 discloses a method whereby an image pickup element which can individually receive light which passes through different pupil areas is used and an image subjected to the focus adjustment by using an image pickup signal which is output from the image pickup element (that is, after the image pickup processing) is generated.

CITATION LIST

Patent Literature

PTL 1: Japanese Patent Application Laid-Open No. H07-199052
PTL 2: Japanese Patent Application Laid-Open No. 2007-4471

SUMMARY OF INVENTION

Technical Problem

However, according to the related arts disclosed in the above Patent Literature, there is a case where a sufficient focusing precision is not obtained and only an image in which an intended object is not focused is obtained. That is, according to Patent Literature 1, since a sensor for performing a contrast calculation and a sensor for performing an image pickup are different, there is a case where the focusing precision cannot always be improved. According to Patent Literature 2, although an image in which a focus point is changed can be obtained after the image pickup, there is a limitation in a range where a focus can be accurately changed, and when such a range exceeds the limitation, it is difficult to normally obtain the image.

Solution to Problem

The present invention has been made in consideration of the above situation, to simultaneously realize a phase difference AF and a contrast AF on the basis of information of light which entered an image pickup element and passed through different pupil areas. According to the present invention, an image pickup apparatus including an image pickup element for photoelectrically converting an optical image of an object which enters through a photographing lens and outputting an image signal, comprises: pupil division means for pupil-dividing light from the photographing lens on a micro lens basis; a sensor having output means for outputting signals corresponding to charges divided by the pupil division means; image generation means for generating an image corresponding to each of the image plane positions by changing outputs of the sensor to be subjected to synthesization on the basis of shift amounts of the signals corresponding to a plurality of image plane positions and; and contrast evaluation means for calculating an evaluation value of a contrast of the image generated by the image generation means.

Advantageous Effects of Invention

According to the invention, the image pickup apparatus which can attain the AF control of a high speed and a high in-focus precision can be provided.

BRIEF DESCRIPTION OF DRAWINGS

FIGS. 3A, 3B and 3C are diagrams illustrating flowcharts for AF control according to the first embodiment of the invention.

DESCRIPTION OF EMBODIMENTS

Preferred embodiments of the present invention will be described in detail in accordance with the accompanying drawings.

Example 1

An image pickup apparatus according to the first embodiment of the invention will be described hereinbelow with reference to FIGS. 1 to 7C.

Figure 1:
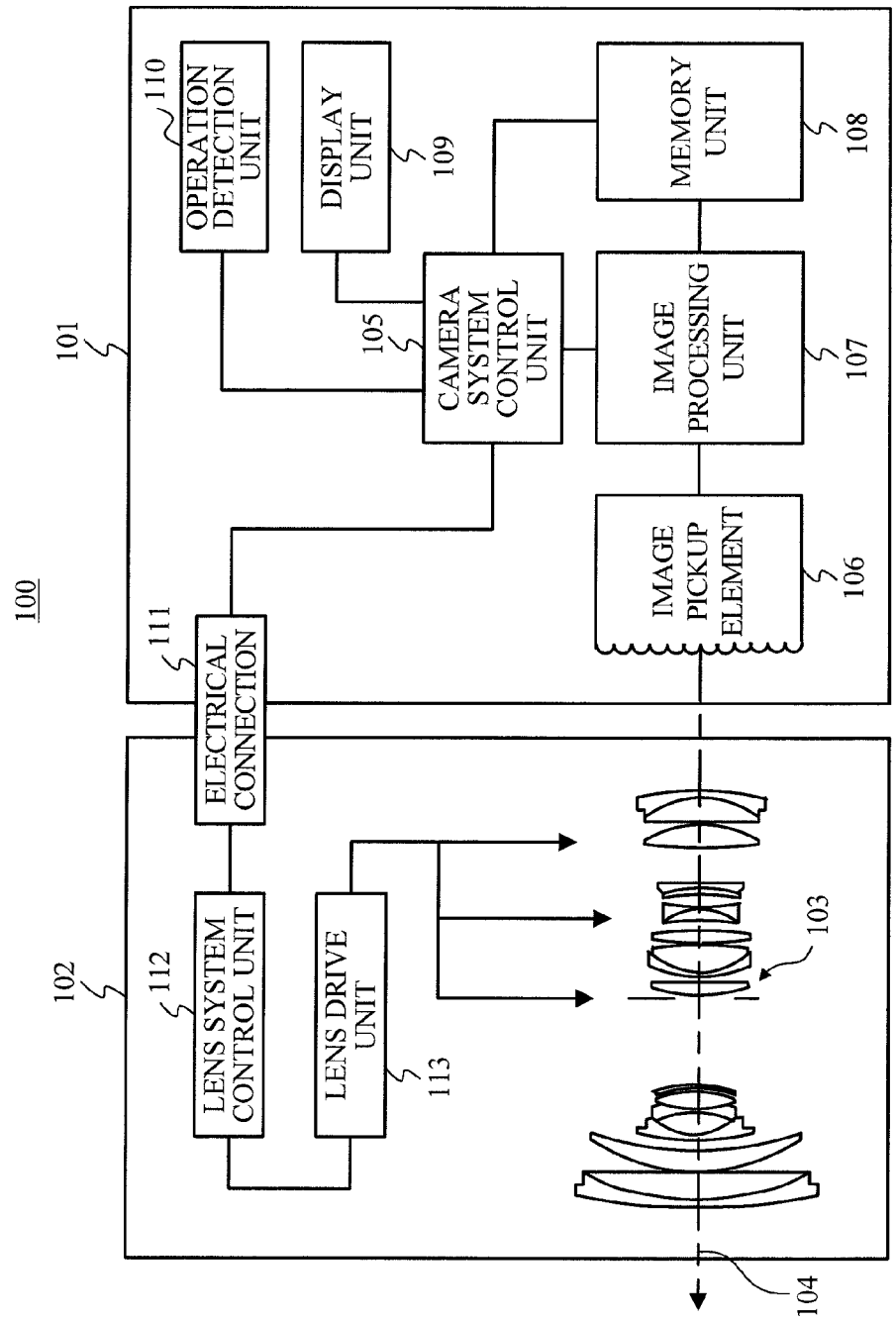
FIG. 1 is a block diagram illustrating a system construction of an image pickup apparatus according to an embodiment of the invention.

FIG. 1 is a block diagram illustrating a system construction of a digital camera serving as an image pickup apparatus according to the invention. A system 100 is constructed by a camera 101 and a lens 102 and has an image pickup system, an image processing system, a recording and reproduction system, and a control system. The image pickup system includes a photographing optical system 103 and an image pickup element 106. The image processing system includes an image processing unit 107. The recording and reproduction system includes a memory unit 108 and a display unit 109. The control system includes a camera system control unit 105, an operation detection unit 110, a lens system control unit 112, and a lens drive unit 113. The lens drive unit 113 can drive a focus lens, a blurring correction lens, an iris, and the like.

The image pickup system is an optical processing system for focusing light (optical image) from the object onto an image pickup plane of the image pickup element 106 through the photographing optical system 103 having a photographing lens. Micro lenses are arranged in a matrix form on the surface (photosensing surface) of the image pickup element 106 and what is called a micro lens array (hereinbelow, referred to as MLA) is formed. In the present embodiment, the MLA constructs pupil division means. Although details of a function and a layout of the MLA will be described hereinafter by using FIGS. 2A to 2C, because of the pupil division means, a focus evaluation amount/a proper exposure amount can be obtained from an output signal of the image pickup element 106. Therefore, the photographing optical system 103 is properly adjusted on the basis of such obtained information. Thus, object light of a proper light amount can be exposed to the image pickup element 106 and the object can be focused in the neighborhood of the image pickup element 106.

The image processing unit 107 has therein an A/D converter, a white balance circuit, a gamma correction circuit, an interpolation operation circuit, and the like and can generate an image for recording by an image processing. Image shift means, image generation means, contrast evaluation means, correlation calculation means, and the like serving as features of the invention can be also included. (In the present embodiment, those elements are constructed as a control program in the camera system control.)

The memory unit 108 has not only a storage unit for actually storing data but also a processing unit necessary for recording. The memory unit 108 outputs data to a recording unit and generates and stores an image which is output to the display unit 109. The memory unit 108 also executes a compression processing of the image, a moving image, an audio, or the like by using a predetermined method.

The camera system control unit 105 generates and outputs a timing signal and the like at the time of image pickup and controls each of the image pickup system, the image processing system, and the recording and reproduction system in response to the external operation. For example, the operation detection unit 110 detects a depression of a shutter release button (not shown) and controls the driving (photoelectric conversion) of the image pickup element 106, the operation of the image processing unit 107, a compression processing of the memory unit 108, and the like. Further, a state of each segment of an information display apparatus for displaying information to a liquid crystal monitor or the like is also controlled by the camera system control unit 105 and the display unit 109.

The adjustment operation of the optical system by the control system will be described. The image processing unit 107 is connected to the camera system control unit 105, and a focus position and an iris position which are proper to a photographing condition are obtained on the basis of the image signal from the image pickup element 106. The camera system control unit 105 transmits an instruction to the lens system control unit 112 through an electrical connection 111. The lens system control unit 112 controls the lens drive unit 113 in accordance with the instruction. Further, a vibration detection sensor (not shown) is connected to the lens system control unit 112. In a mode for making a vibration correction, a vibration correction lens is controlled through the lens drive unit 113 on the basis of a signal of the vibration detection sensor.

Figure 2A:
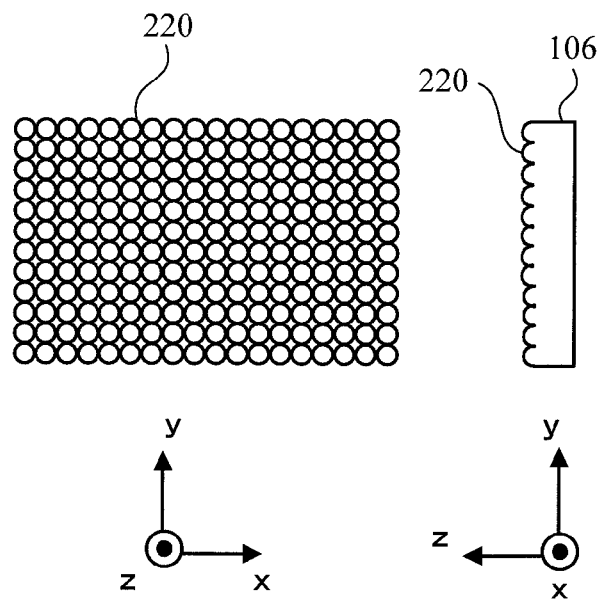
FIGS. 2A, 2B and 2C are conceptual diagrams of an optical system of the image pickup apparatus according to the first embodiment of the invention.
Figure 2B:
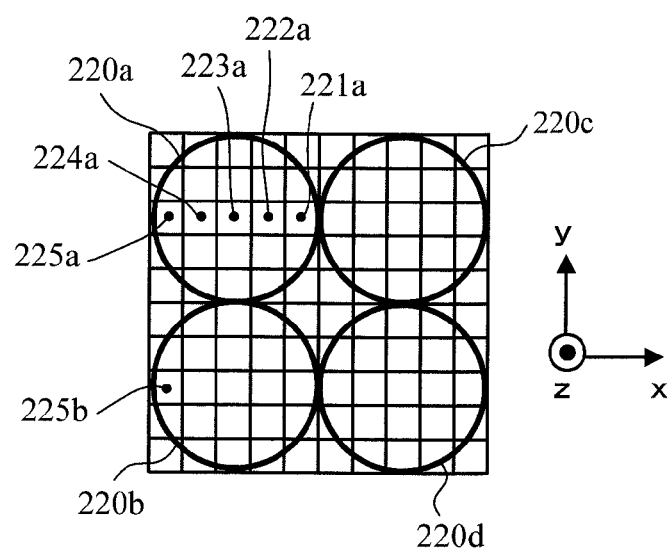
Figure 2C:
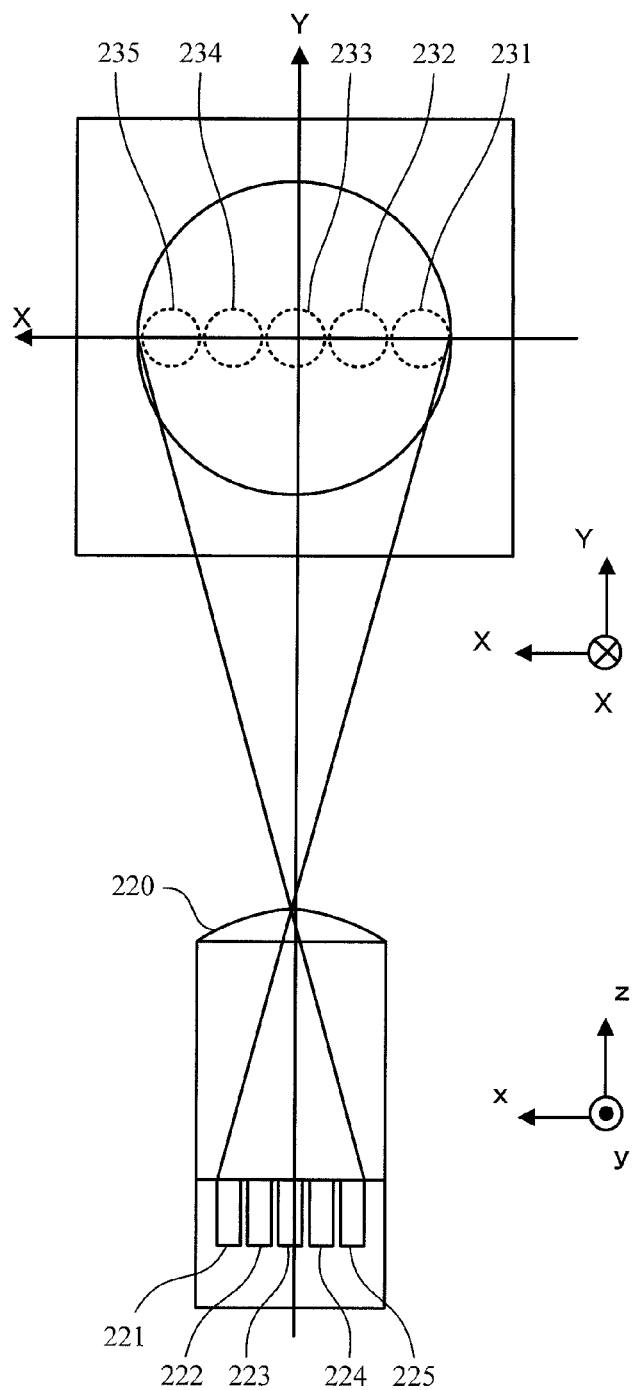

Subsequently, FIGS. 2A to 2C are diagrams for describing features of the photographing optical system in the present embodiment. In order to apply the invention, it is necessary to obtain information of an angle as well as a position of rays, which information is called light field information or the like. In the present embodiment, in order to obtain the angle information, the MLA is arranged near the image pickup plane of the photographing optical system 103 and a plurality of pixels are made to correspond to one of the micro lenses constructing the MLA.

FIG. 2A is a diagram conceptually illustrating a correspondence relation between the image pickup element 106 and an MLA 220. FIG. 2B is a conceptual diagram illustrating a correspondence between the pixels of the image pickup element 106 and the MLA 220. FIG. 2C is a diagram illustrating that the pixels disposed under the MLA by the MLA 220 are made to correspond to specific pupil areas.

As illustrated in FIG. 2A, the MLA 220 is arranged on the image pickup element 106 such that a front principal point of the MLA 220 is located near the focusing plane of the photographing optical system 103. FIG. 2A illustrates a side elevational view of the image pickup element 106 and a front view of the MLA 220. The lenses of the MLA 220 are arranged so as to cover the pixels on the image pickup element 106. Although each of micro lenses constructing the MLA 220 is enlargedly illustrated in FIG. 2A so as to be easily seen, actually, each micro lens has a size which is about a few times as large as the pixel (the actual size will be described by using FIG. 2B).

FIG. 2B is a partial enlarged diagram of a front view of the MLA 220 in FIG. 2A. A frame arranged in a matrix form illustrated in FIG. 2B indicates each pixel of the image pickup element 106. The micro lenses constructing the MLA 220 are shown by thick circles 220a, 220b, 220c, and 220d, respectively. As will be obvious from FIG. 2B, a plurality of pixels are allocated to one micro lens. In the example of FIG. 2B, 25 (=5 rows×5 columns) pixels form one group correspondingly to one micro lens. That is, the size of each micro lens is equal to a size of (5 times×5 times) as large as the pixel size.

FIG. 2C is a diagram illustrating a cross section regarding one micro lens in a case where the MLA is cut so that the cross section includes an optical axis of the micro lens and the longitudinal direction (X direction) of the image pickup element is parallel to the lateral direction of the diagram. Reference numerals 221, 222, 223, 224, and 225 in FIG. 2C denote pixels (one photoelectric conversion unit) of the image pickup element 106. A diagram illustrated in an upper position of FIG. 2C shows an exit pupil plane of the photographing optical system 103. Actually, although the exit pupil plane (X-Y plane) is parallel with the vertical direction (y direction) of the paper surface of FIG. 2C in accordance with correspondence in directions between the exit pupil plane and the sensor illustrated in a lower position of FIG. 2C, the projection direction of the exit pupil plane is changed for description. To simplify the description of FIG. 2C, a one-dimensional projection/signal processing will now be described. That is, it is assumed that the pupil division is of one dimension of only 231 to 235 and a corresponding pixel arrangement is also set to one dimension of, for example, only 221a to 225a in FIG. 4B. This presumption is also applied to a description of FIGS. 6A to 6D. An expansion to a two-dimensional projection/signal processing in the actual apparatus can be easily performed.

There are correspondence positional relations between the pixels 221, 222, 223, 224, and 225 in FIGS. 2C and 221a, 222a, 223a, 224a, and 225a in FIG. 2B, respectively. As illustrated in FIG. 2C, each pixel is designed so as to be conjugate with a specific exit pupil area on the exit pupil plane of the photographing optical system 103 by the MLA 220. In the example of FIG. 2C, the pixel 221 and an area 231 correspond to each other, the pixel 222 and an area 232 correspond to each other, the pixel 223 and an area 233 correspond to each other, the pixel 224 and an area 234 correspond to each other, and the pixel 225 and an area 235 correspond, respectively. That is, only the light which passes through the area 231 on the exit pupil plane of the photographing optical system 103 enters the pixel 221. This is true of other pixels. As a result, information of an angle of incidence of the light can be obtained from the positional relations between the passed area on the pupil plane and the pixels on the image pickup element 106.

A processing for obtaining a focus evaluation value from the output signal of the image pickup element 106 by using the photographing optical system shown in the embodiment will be described by using FIGS. 3A to 3C, 4A to 4C, 5, and 6A to 6D.

Figure 3A:
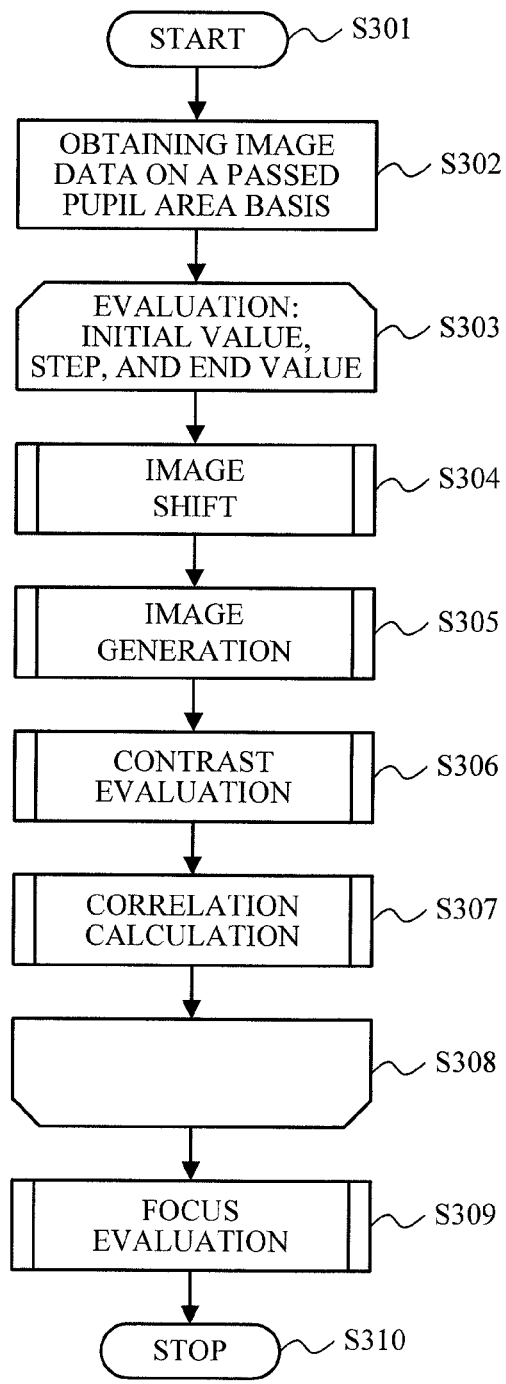
Figure 3B:
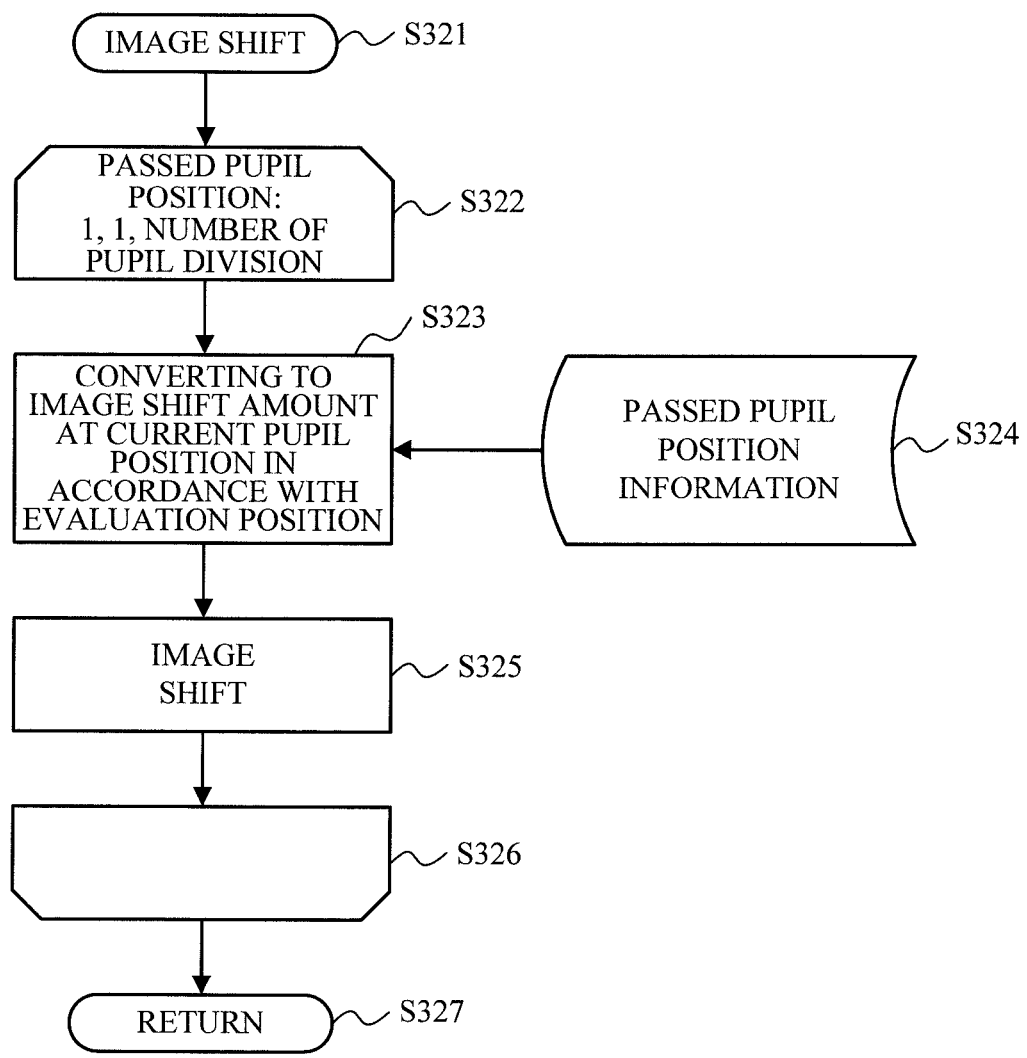

FIGS. 3A to 3C and FIGS. 4A to 4C are flowcharts for obtaining the focus evaluation value of the invention. FIG. 3A shows the flowchart for the whole operation for obtaining the focus evaluation value, FIG. 3B shows the flowchart for the operation of the image shift means, and FIG. 3C shows the flowchart for the operation of the image generation means, respectively. Those processings are attained by a method whereby the camera system control unit 105 loads each control program from a storage device (not shown) and executes it. A description will be made hereinbelow in order of steps starting from FIG. 3A.

Step S301 indicates the start of the obtaining operation of the focus evaluation value. For example, it corresponds to a case where the photographing operation is started when the operation detection unit 110 of the image pickup apparatus of FIG. 1 detects the specific operation from the photographer (for example, depression of a release button).

Step S302 corresponds to a case where under the control of the camera system control unit 105, the image pickup element 106 is exposed in accordance with the photographing condition, a reading (A/D conversion) is executed, and data (image pickup signal of the object) is obtained. Although an exposure amount at the time of photographing can be also calculated from an exposure time and an exposure amount in this case, since it is not features of the invention, description thereof is omitted.

Steps S303 to S308 are a loop processing. In step S303, while shifting a focus evaluation position (corresponding to a re-formation position of an image, which will be described hereinafter by using FIGS. 6A to 6D) by a predetermined position (step) from an initial value which has previously been given, a calculation is executed up to a predetermined end value. The focus evaluation value is determined from the best value among the evaluation values obtained during the loop and the corresponding evaluation position is obtained as a focus point.

In step S304, the camera system control unit 105 makes the image shift means operative, thereby obtaining an image shift amount. Details of the operation of the image shift means will be described hereinafter by using the flowchart of FIG. 3B.

In step S305, the camera system control unit 105 makes the image generation means operative, thereby performing an image generation. Details of the operation of the image generation means will be described hereinafter by using the flowchart of FIG. 3C.

In step S306, the camera system control unit 105 makes the contrast evaluation means operative, thereby obtaining a contrast evaluation value. Details of the operation of the contrast evaluation means will be described hereinafter by using the flowchart of FIG. 4A.

In step S307, the camera system control unit 105 makes the correlation calculation means operative, thereby obtaining a correlation value. Details of the operation of the correlation calculation means will be described hereinafter by using the flowchart of FIG. 4B.

In step S309, the camera system control unit 105 makes the focus evaluation means operative, thereby obtaining a focus evaluation value. Details of the operation of the focus evaluation means will be described hereinafter by using the flowchart of FIG. 4C.

As a result, by executing the reading of the image pickup element 106 only once in step S302, the focus evaluation value including the contrast evaluation value can be obtained and the high processing speed can be attained.

Subsequently, the operation of the image shift means will be described in detail by using the flowchart of FIG. 3B.

Step S321 indicates the start of the obtaining operation of the image shift means.

Steps S322 to S326 are a loop processing. In step S322, a loop calculation is executed the number of times corresponding to the number of pupil division (the number of times as many as the number of pixels of the image pickup element corresponding to one micro lens). For example, since the micro lens is divided into 25 areas (two dimension) in the example illustrated in FIGS. 2A to 2C, an image shift amount corresponding to a pupil position of each of the 25 areas is calculated. As will be described hereinafter by using FIGS. 6A to 6D, even on the same re-formation plane in the re-formation of the image (this is synonymous with that a passed pupil area is different, in a case where there is an enough distance to the exit pupil), if the angle of incidence is different, then a shift amount of the image differs. This loop processing is performed to reflect such a fact to the image generation.

In step S323, a shift amount in each pupil area corresponding to the evaluation position is calculated on the basis of the data from step S324. In step S324, the correspondence relation between each pixel and the MLA is stored and information from which it can be known that from which pupil area each pixel receives the light is stored.

In step S325, the pixels receiving rays of the same angle of incidence (receiving rays from the same pupil area) are shifted on the basis of the information in step S323. For example, 225a and 225b in FIGS. 2A to 2C correspond to the pixels receiving the light of the same angle of incidence. Such pixels exists as many as the number of micro lenses constructing the MLA.

In step S327, the processing routine is returned to step S304 in which this routine is called.

The image shift means will be further specifically described hereinafter by using FIGS. 6A to 6D.

Details of the operation of the image generation means will be described by using the flowchart of FIG. 3C.

Step S331 indicates the start of the operation of the image generation means.

In step S332, data in an area for addition in step S335 is initialized (filled with 0). It is sufficient that the size of data area in this instance is equal to the size corresponding to the number of the micro lenses and it is convenient if a gradation of the data is only that which can store the product of a gradation of the original data and the number of pupil division. For example, assuming that the original data is 8-bit data and the number of pupil division is equal to 25, there is no need to consider an overflow of the data in an arithmetic operation processing in the case of 13 bits (>8 bits+log$_2$25).

Steps S333 to S337 are a loop processing. In step S333, a loop calculation is executed in accordance with the number of micro lenses constructing the MLA (that is, with respect to each micro lens). For example, in the example illustrated in FIGS. 2A to 2C, a value of [(the number of pixels of the original image pickup element)÷25 (the number of pupil division)] is equal to the number of micro lenses).

Steps S334 to S336 are a loop processing. In step S334, a loop calculation is executed in accordance with the number of pupil division. For example, in the example illustrated in FIGS. 2A to 2C, since the micro lens is divided into 25 areas, light from the pupil position of each of the 25 areas is added in step S335. When the shift amount is not integer times as long as the pixel, in the addition step S335, the light is properly divided to be added. (For example, the light is properly added in accordance with an overlapping area.) Thus, an image focused at each evaluation position is re-formed. Image data of the generated image is stored into the memory unit 108 or another storage means (not shown) by control of the camera system control unit 105. Therefore, the generated image can be re-formed and displayed.

In step S338, the processing routine is returned to step S305 in which this routine is called.

The image generation means will be further specifically described hereinafter by using FIGS. 6A to 6D.

Figure 4A:
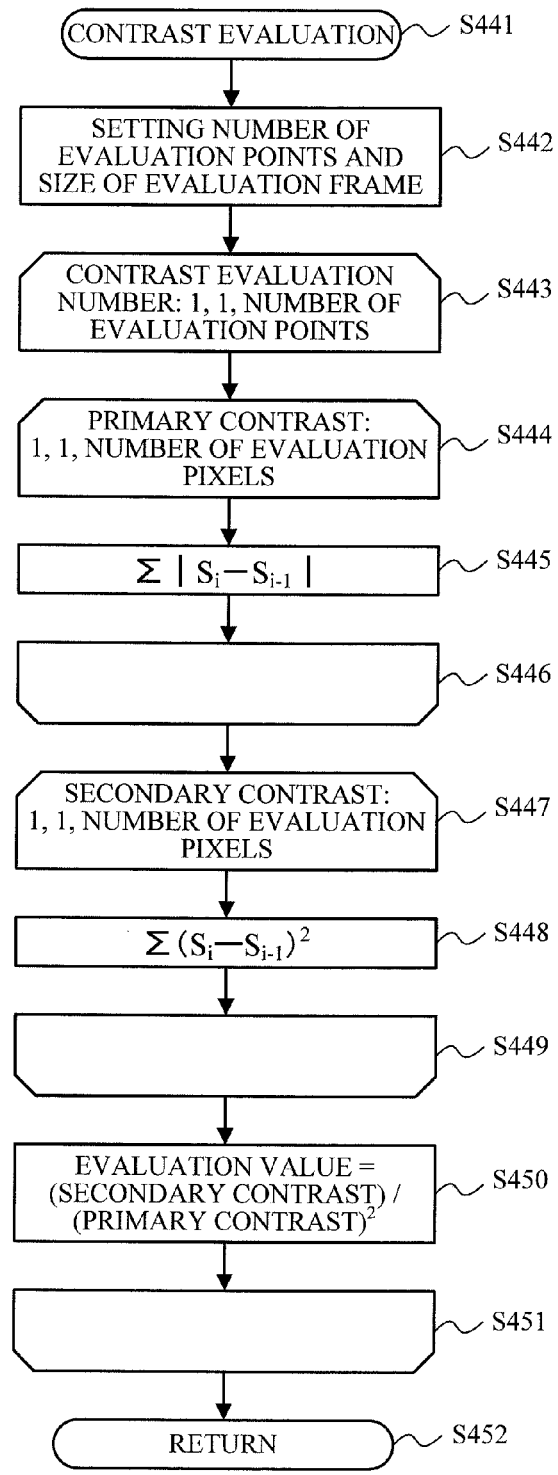
FIGS. 4A, 4B and 4C are diagrams illustrating flowcharts for AF control according to the first embodiment of the invention.

Details of the operation of the contrast evaluation means will be described by using the flowchart of FIG. 4A. Step S441 indicates the start of the operation of the contrast evaluation means.

In step S442, the number of evaluation points to be subjected to the contrast evaluation and a size of evaluation frame (for example, frame using the evaluation point as a center) are set. When the number of evaluation points is set to be larger, the whole display screen can be covered thereby. However, there is such a problem that it takes a time for evaluation. The number of evaluation points is properly set by a setting of the user or the like. On the other hand, if the evaluation frame is set to be large, even in the case of a texture in which there do not locally exist much patterns, the image can be focused. However, if the evaluation frame is too large, what is called perspective conflict in which object images locating at different distances are simultaneously evaluated occurs. Thus, the size of evaluation frame is properly set so that those problems can be solved.

Steps S443 to S451 are a loop processing. In step S443, an arithmetic operation is repeatedly executed so as to obtain the evaluation value corresponding to the evaluation point decided in step S442.

Steps S444 to S446 are a loop processing. In step S444, a primary contrast arithmetic operation is executed with respect to the pixels in each evaluation frame decided in step S442. As shown in step S445, as a primary contrast arithmetic operation, $\Sigma|S_i-S_{i-1}|$ is calculated. $S_i$ denotes a luminance which is output from the i-th image generation means. By calculating as mentioned above, a luminance difference between the adjacent pixels can be integrated. However, in the description of this step, an expression corresponding to the case where the images are one-dimensionally arranged is shown in order to clarify the description. In the two-dimensional images, luminance differences in both of the vertical and lateral directions may be integrated or only the luminance difference in one direction may be properly integrated.

Steps S447 to S449 are a loop processing. In step S447, a secondary contrast arithmetic operation is executed with respect to the pixels in each evaluation frame decided in step S442. As shown in step S448, as a secondary contrast arithmetic operation, $\Sigma(S_i-S_{i-1})^2$ is calculated. Also in the description of this step, an expression corresponding to the case where the images are one-dimensionally arranged is shown in order to clarify the description.

Figure 5:
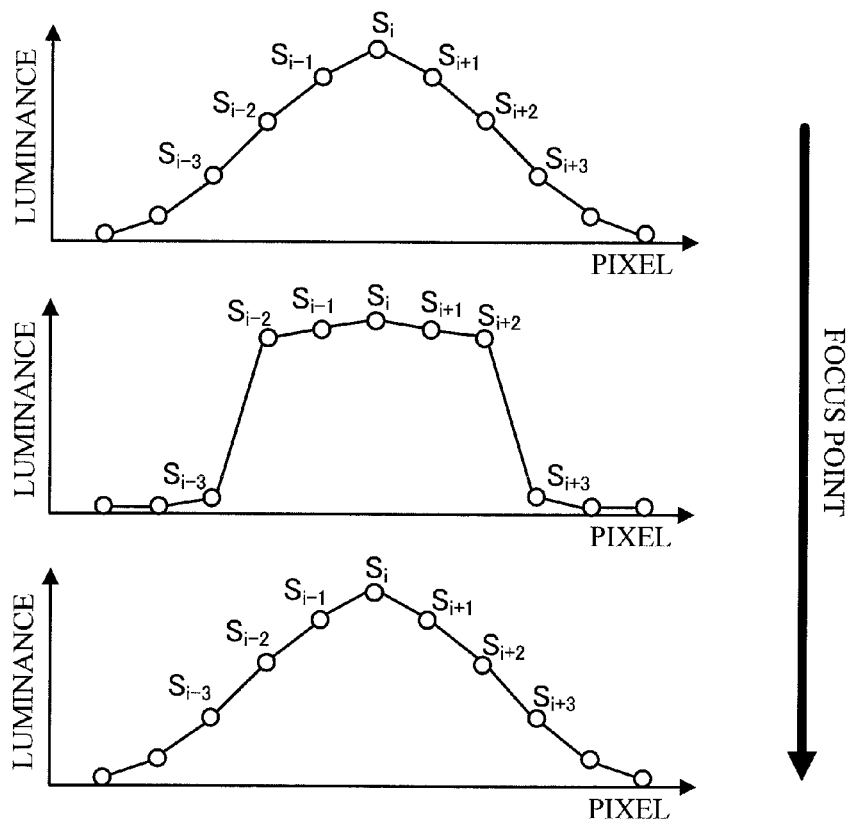
FIG. 5 is a conceptual diagram of an optical system for describing the operation of the contrast AF.

FIG. 5 illustrates a conceptual diagram of a change of $S_i$ at the time when the focus point is changed. The middle diagram of FIG. 5 shows the best focus state and the upper and lower diagrams of FIG. 5 show a focus blurring state. When the focus point is changed as shown by an arrow in FIG. 5, an area having a large change of luminance (=portion of the high contrast, FIG. 5(b)) appears and the contrast becomes low around that area. However, even when the contrast decreases, the integration of the luminance difference between the adjacent pixels (=primary contrast) does not largely change. In FIG. 5, the integration of the primary contrast from $S_{i-3}$ to $S_{i+3}$ almost becomes a difference between $S_{i-3}$ and $S_{1-3}$ and does not largely change for the focus point. On the other hand, the secondary contrast largely changes correspondingly to the focus point.

In step S450, therefore, a value obtained by dividing the secondary contrast by the square of the primary contrast is set as a contrast evaluation value. By processing as mentioned above, the contrast evaluation value is normalized for the luminance and the contrast evaluation value of the object according to the focus point can be obtained.

Although the contrast evaluation value is obtained by the method as mentioned above in the present embodiment, another calculating method can be also used so long as a contrast evaluation value accompanied with a focus fluctuation is obtained.

In step S452, the processing routine is returned to step S306 in which this routine is called.

Figure 4B:
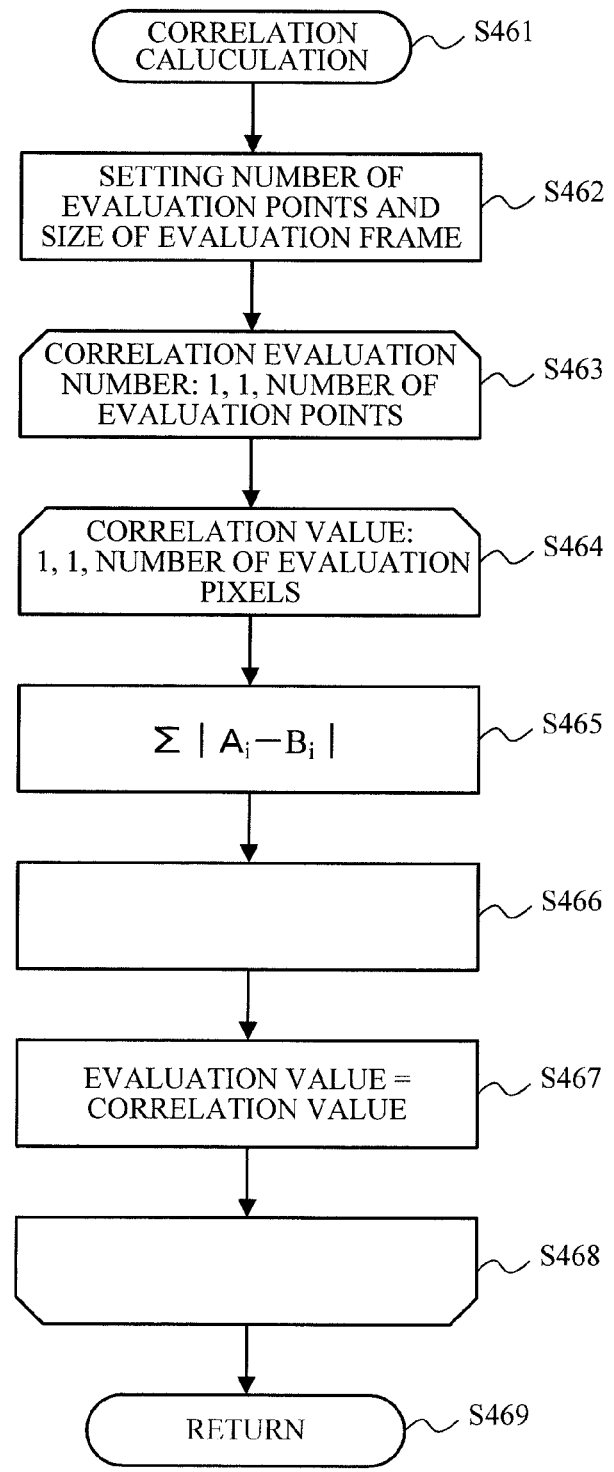

Details of the correlation calculation means will be described by using the flowchart of FIG. 4B.

Step S461 indicates the start of the operation of the correlation calculation means.

In step S462, the number of evaluation points at which the evaluation is performed and the size of evaluation frame are set in a manner similar to step S442.

Steps S463 to S468 are a loop processing. In step S463, an arithmetic operation is repeatedly executed so as to obtain the evaluation value corresponding to each of the evaluation points decided in step S462.

Steps S464 to S466 are a loop processing. In step S464, a correlation calculation is executed with respect to the pixels in the evaluation frame decided in step S462. As shown in step S465, as a correlation calculation, $\Sigma|A_i-B_i|$ is calculated. $A_i$ denotes a luminance of an i-th pixel corresponding to a specific passed pupil area. $B_i$ denotes a luminance of an i-th pixel corresponding to a passed pupil area different from that of $A_i$. For example, in FIGS. 2A to 2C, it is sufficient that the luminance corresponding to an array of only the pixels corresponding to the pixel 222 is set to $A_i$ and the luminance corresponding to an array of only the pixels corresponding to the pixel 224 is set to $B_i$. As for the selection of the pixel in which pupil area, it is sufficient to decide it on the basis of a length of a reference length, a vignetting situation of the pupil plane, and the like.

By setting as mentioned above, the correlation between the images corresponding to the different passed pupil areas can be calculated and the evaluation value based on what is called a phase difference AF can be obtained. In step S467, the obtained correlation value is stored as an evaluation value.

In the evaluation expression of $\Sigma|A_i-B_i|$ mentioned above, the portion of the small correlation value corresponds to the portion of the best focus state. Although the correlation calculation is executed by the method of adding the absolute values of the differences here, the correlation calculation may be executed by another calculating method such as method of adding maximum values, method of adding minimum values, method of adding differential square values, or the like.

In step S469, the processing routine is returned to step S307 in which this routine is called.

Figure 4C:
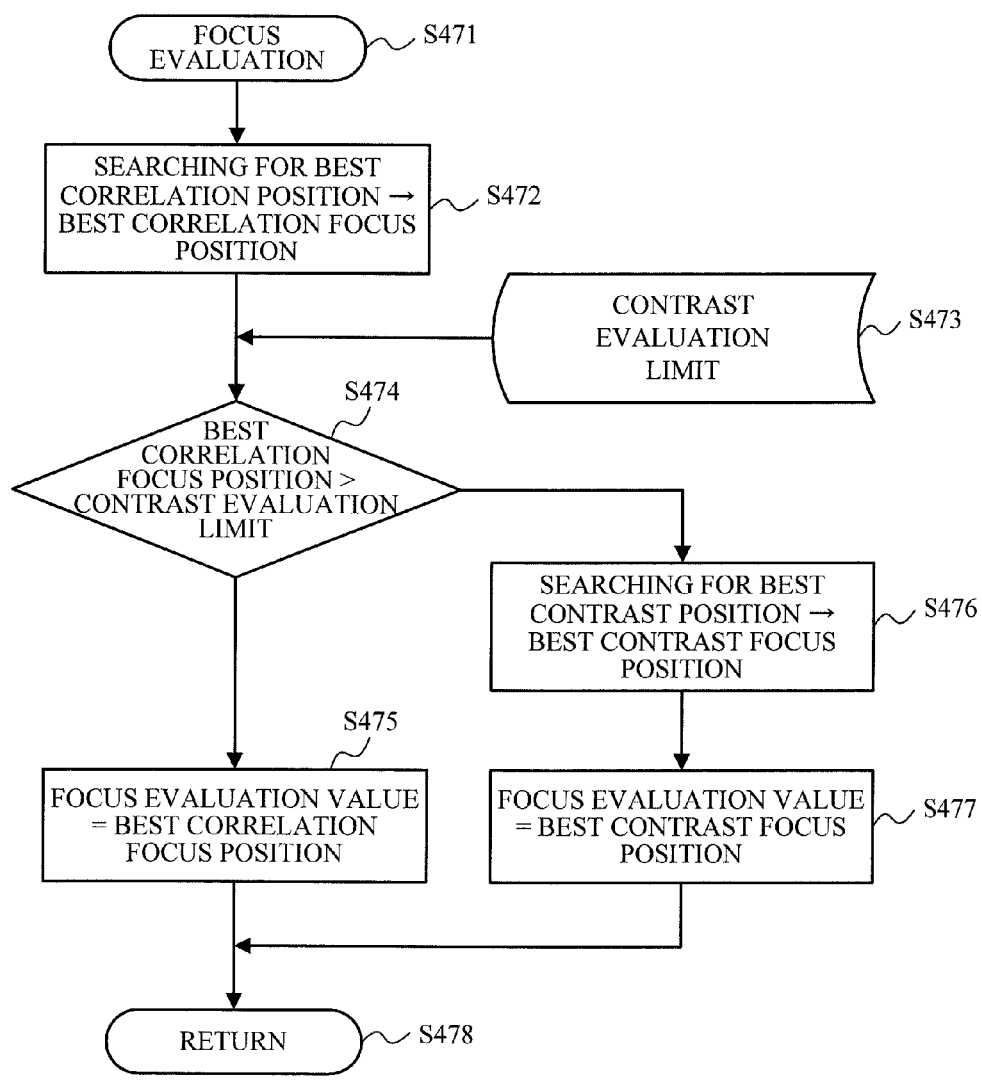

Details of the focus evaluation means will be described by using the flowchart of FIG. 4C. Step S471 indicates the start of the operation of the focus evaluation means.

In step S472, the best position of the correlation calculation obtained by the loop of steps S303 to S308 in FIG. 3A is obtained and the best focus position by the correlation calculation means is obtained. In the correlation value shown in step S465 in FIG. 4B, the position of the minimum value is obtained as a best focus position.

In step S474, whether or not the best correlation focus position exceeds a limit value of the contrast evaluation which is derived in step S473 is discriminated. This is because in the re-formation of the image, which will be described by using FIGS. 6A to 6D, since a re-formable range which is decided from an optical design for obtaining angle information is predetermined, it is necessary to discriminate whether or not the best correlation focus position exceeds such a value.

If it exceeds, the processing routine advances to step S475 and the position at which the best correlation is obtained is used as a focus evaluation value.

If it does not exceed, step S476 follows, the best contrast position is obtained, and the best focus position by the contrast evaluation means is obtained. According to the expression shown in step S450 in FIG. 4A, the position of the largest value is obtained as a best focus position. Step S477 follows and the position obtained from the best contrast is used as a focus evaluation value. The camera system control unit 105 generates a lens drive instruction from the obtained focus evaluation value and transmits to the lens system control unit 112 through an electrical connection 111. The lens system control unit 112 controls the lens drive unit 113 on the basis of the received lens drive instruction and drives the photographing optical system 103.

In step S478, the processing routine is returned to step S309 in which this routine is called.

Subsequently, in FIGS. 6A to 6D, the image shift and the image generation are conceptually shown and a validity of the contrast calculation by the image re-formation will be described.

Figure 6A:
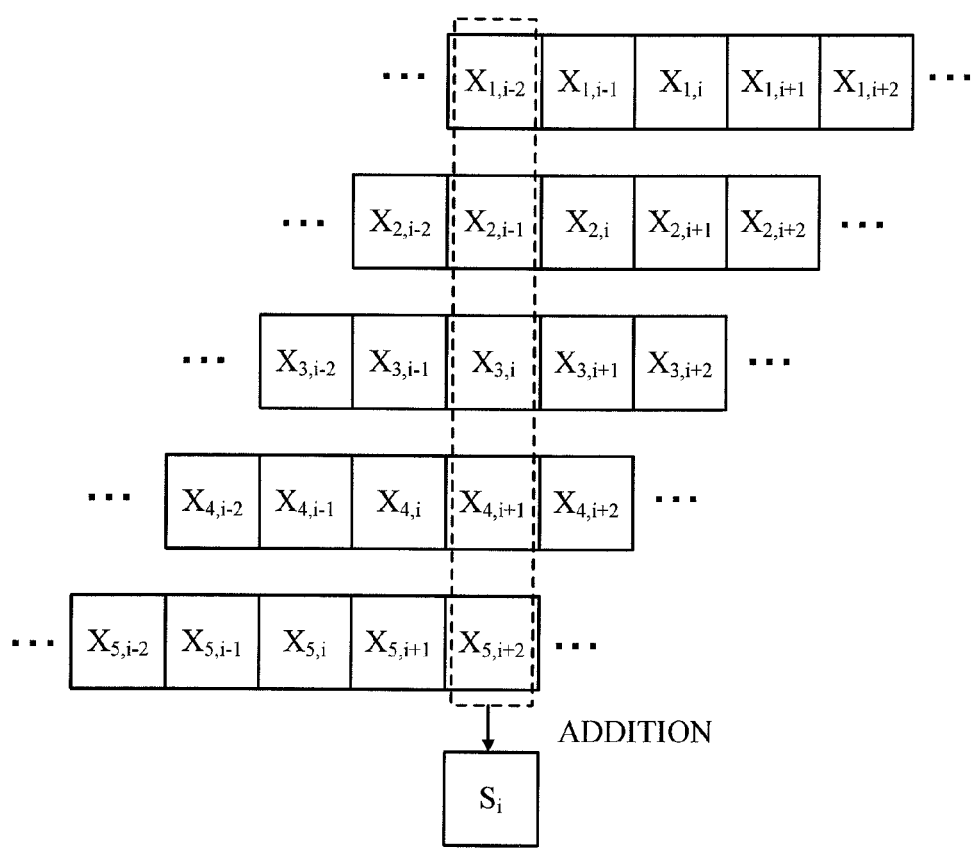
FIGS. 6A, 6B, 6C and 6D are conceptual diagrams for describing the re-formation operation of an image.
Figure 6B:
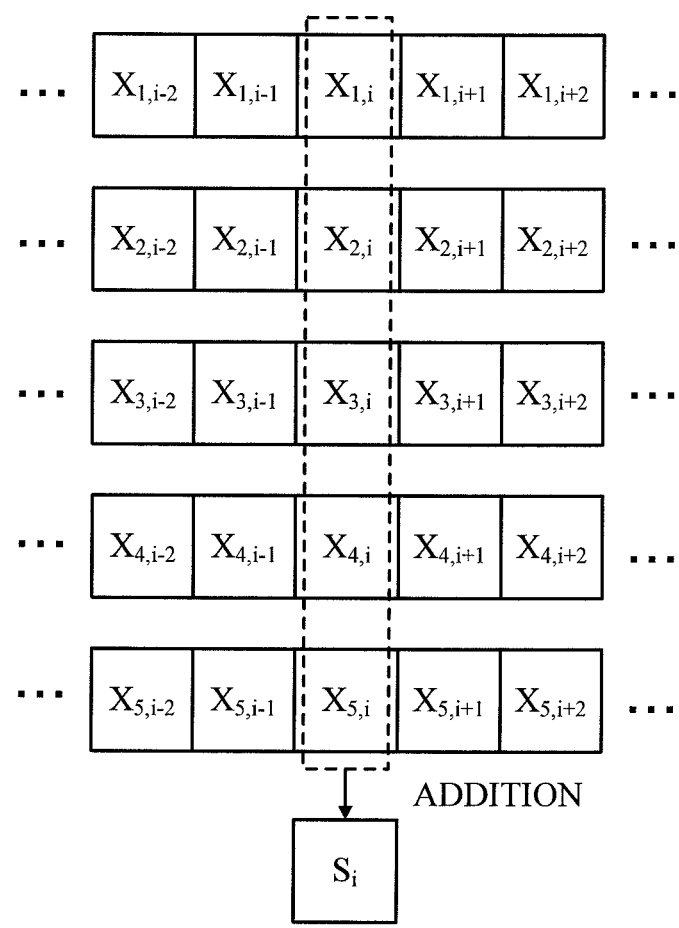
Figure 6C:
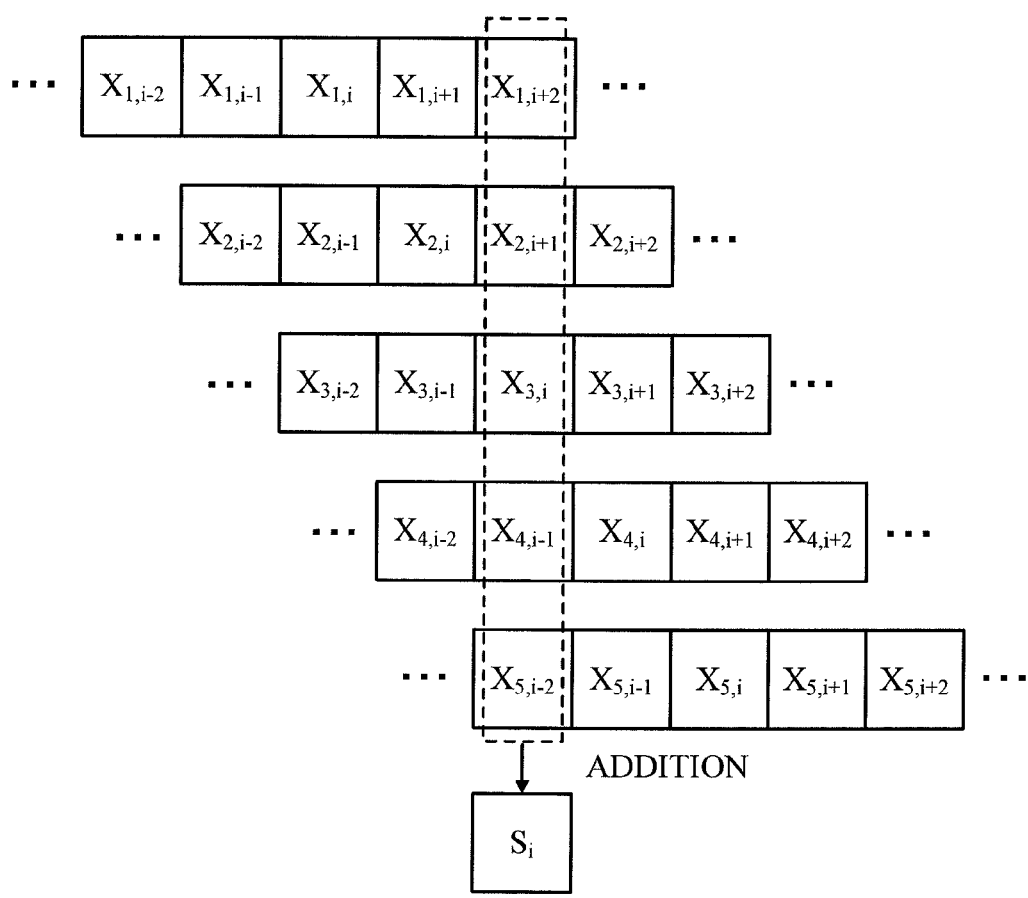
Figure 6D:
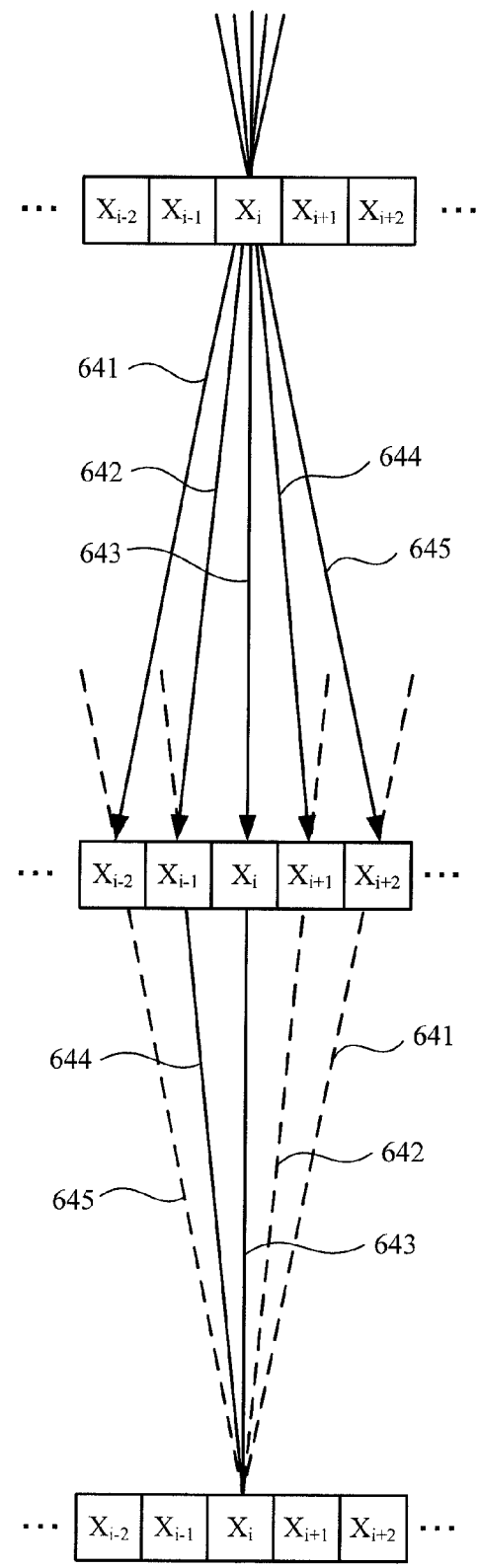

In FIGS. 6A to 6D, FIG. 6B illustrates a plane where the image pickup element 106 exists actually and the image is obtained. FIG. 6A illustrates a re-formation plane (re-formation plane 1) on the object side than FIG. 6B. FIG. 6C illustrates a re-formation plane (re-formation plane 2) on the remote side from the object side than FIG. 6B. As mentioned above, in the diagrams, in order to clarify the description, the pupil division direction and the pixel arrangement are set to one dimension, respectively.

In FIG. 6B, $X_{1,i}$, $X_{2,i}$, $X_{3,i}$, $X_{4,i}$, and $X_{5,i}$ denote data (image data) obtained after the light passes through the pupil areas 1, 2, 3, 4, and 5 and entered a micro lens $X_i$, respectively. That is, the former half of a subscript indicates the passed pupil area and the latter half indicates the number of the micro lens. In the relation with a physical position, $X_{1,i}$ indicates the data obtained from the area 221 in FIGS. 4C and $X_{2,i}$ indicates the data obtained from the area 222 in FIG. 4C. Numerals 3, 4, and 5 of the subscripts indicate that the data corresponds to the areas 223, 224, and 225, respectively.

To generate the image on the obtaining plane, it is sufficient to add the data (luminance) obtained after the light enters the micro lens $X_i$. Specifically speaking, an integration value in the angle direction of the light which enters the micro lens $X_i$ can be obtained by $S_i = X_{1,i} + X_{2,i} + X_{3,i} + X_{4,i} + X_{5,i}$. By executing the above processing with respect to all of the micro lenses, an image similar to that of a normal camera is generated.

Subsequently, a generation method of the image on the re-formation plane 1 will be considered. As described in FIGS. 2A to 2C, in the photographing optical system in the present embodiment, since the light which enters each pixel is limited to a specific pupil area, the angle of incidence is already known. The position of each pixel on the re-formation plane is re-formed along such an angle. Specifically speaking, in the case of the data such as $X_{1,i}$ in which the subscript of the pupil area is equal to 1, it is assumed that the light enters at an angle shown at 641 in FIG. 6D. Numerals 2, 3, 4, and 5 of the subscripts of the pupil areas indicate that the data corresponds to angles 642, 643, 644, and 645, respectively. In this case, the light which enters the micro lens $X_i$ on the re-formation plane 1 enters dispersedly to $X_{i-2}$ to $X_{i+2}$ (one dimension) at the obtaining plane. More specifically speaking, the light is dispersed to $X_{1,i-2}$, $X_{2,i-1}$, $X_{3,i}$, $X_{4,i+1}$, $X_{5,i+2}$. In order to reconstruct the image on the re-formation plane 1 without limiting to $X_i$, it can be also understood that it is required to re-form an image at the re-formation plane 1 only to shift and add the image in accordance with the angle of incidence. To generate an image on the re-formation plane 1, the data in which the subscript of the pupil area is equal to 1 is shifted to the right by two pixels, the data in which the subscript of the pupil area is equal to 2 is shifted to the right by one pixel, and the data in which the subscript of the pupil area is equal to 3 is not shifted. The data in which the subscript of the pupil area is equal to 4 is shifted to the left by one pixel and the data in which the subscript of the pupil area is equal to 5 is shifted to the left by two pixels. Thus, the shift according to the angle of incidence can be applied. After that, the data at the re-formation plane 1 can be obtained by the addition in the vertical direction illustrated in FIG. 6A. Specifically speaking, an integration value in the angle direction of the light which enters the micro lens $X_i$ at the re-formation plane 1 can be obtained by $S_i = X_{1,i-2} + + X_{3,i} + X_{4,i+1} + X_{5,i+2}$. Thus, an image at the re-formation plane 1 can be obtained.

Now, assuming that there is a bright point in $X_i$ at the re-formation plane 1, the light is dispersed to $X_{1,i-2}$, $X_{2,i-1}$, $X_{3,i}$, $X_{4,i+1}$, and $X_{5,i+2}$ and is in what is called a blurring state on the obtaining plane. However, by generating an image at the re-formation plane 1 mentioned above, a bright point is again formed in $X_i$ and an image of a high contrast is obtained. That is, by re-forming the image and calculating the contrast, what is called a contrast AF can be performed.

As will be understood from FIG. 6C, even at a re-formation plane 2, an image can be generated by a method substantially similar to that at the re-formation plane. If an arranging direction of the re-formation plane is different (this means that the direction is on the side opposite to the object), it is sufficient to merely reverse the shift direction.

Figure 7A:
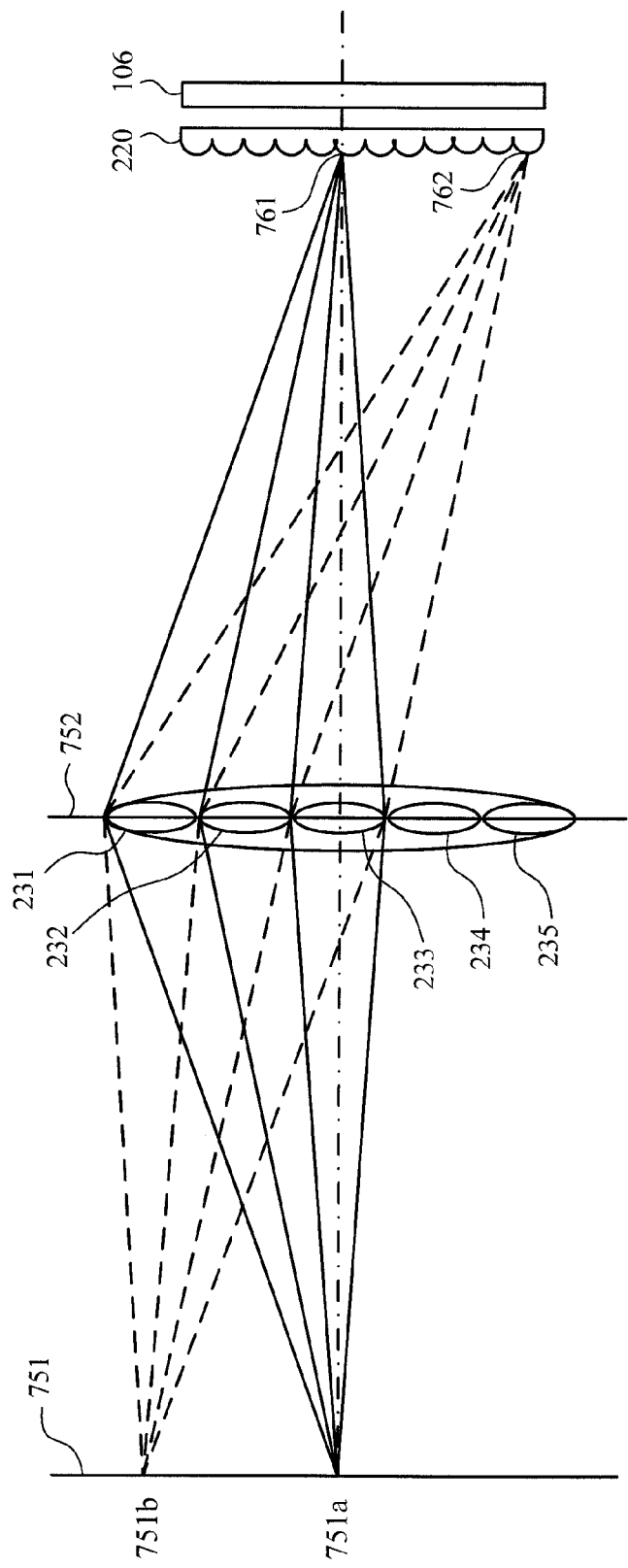
FIGS. 7A, 7B and 7C are conceptual diagrams of an optical system which can be applied to the invention.
Figure 7B:
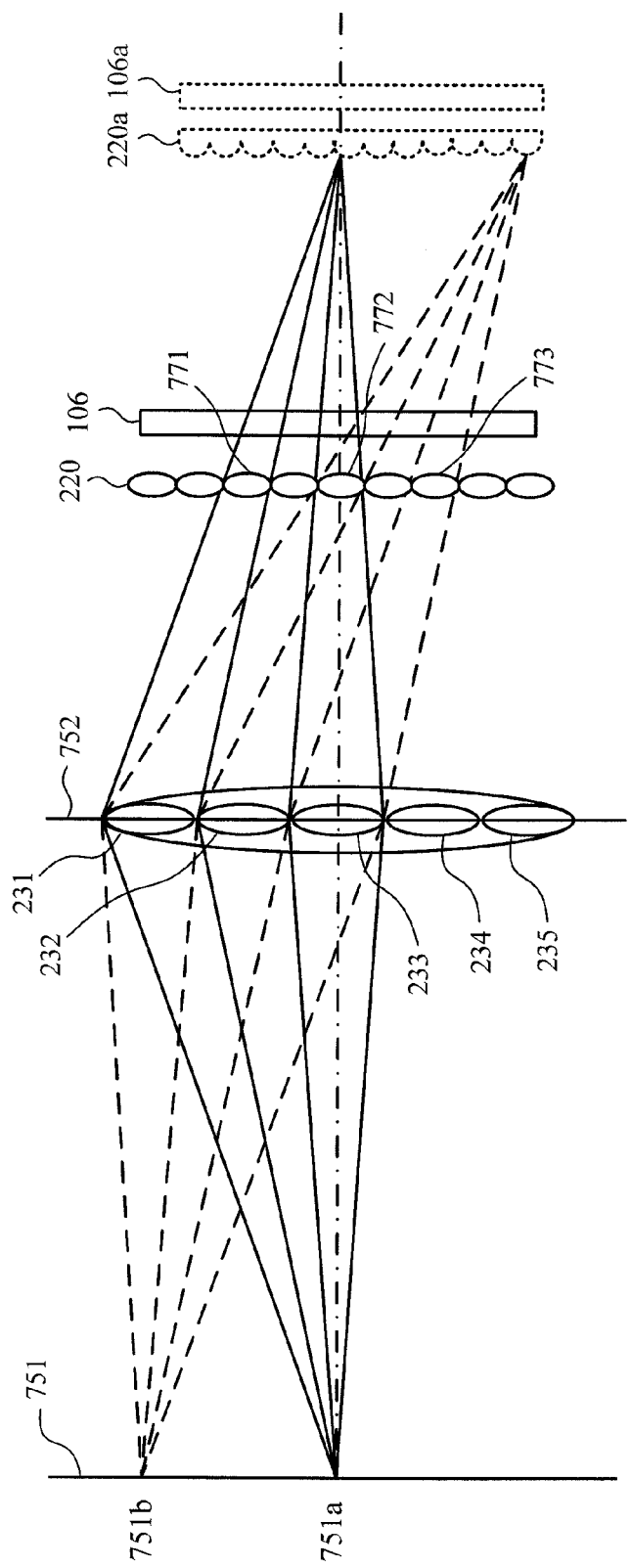
Figure 7C:
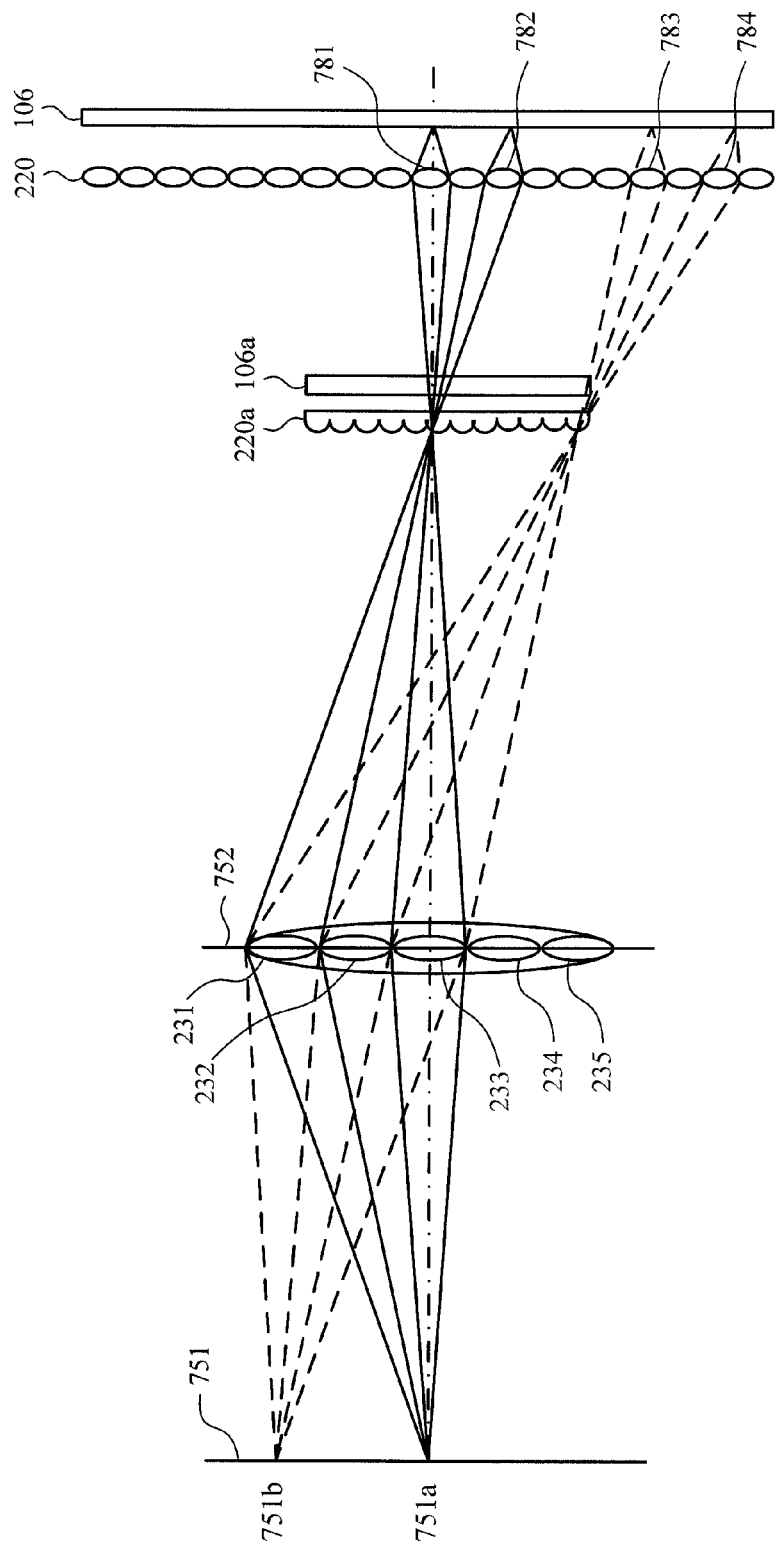

Subsequently, an example of another optical system which can be applied to the embodiment will be described by using FIGS. 7A to 7C. FIGS. 7A to 7C are diagrams conceptually illustrating a state where the light from the object (object to be photographed) is focused onto the image pickup element 106. FIG. 7A corresponds to the optical system described in FIGS. 2A to 2C and is an example in which the MLA 220 is arranged in the neighborhood of the image pickup plane of the photographing optical system 103. FIG. 7B is an example in which the MLA 220 is arranged near the object than the image pickup plane of the photographing optical system 103. FIG. 7C is an example in which the MLA 220 is arranged away from the object than the image pickup plane of the photographing optical system 103.

In FIGS. 7A to 7C, reference numeral 106 denotes the image pickup element; 220 the MLA; 231 to 235 the pupil areas used in FIGS. 2A to 2C; 751 an object plane; 751a and 751b proper points on the object; and 752 a pupil plane of the photographing optical system. Reference numerals 761, 762, 771, 772, 773, 781, 782, 783, and 784 denote specific micro lenses on the MLA, respectively. In FIGS. 7B and 7C, reference numeral 106a denotes a virtual image pickup element and 220a indicates a virtual MLA. They are illustrated as references in order to clarify the correspondence relation with FIG. 7A. The light which exits from the point 751a on the object and passes through the areas 231 and 233 on the pupil plane is shown by solid lines and the light which exits from the point 751b on the object and passes through the areas 231 and 233 on the pupil plane is shown by broken lines.

In the example of FIG. 7A, as also described in FIGS. 2A to 2C, by arranging the MLA 220 in the neighborhood of the image pickup plane of the photographing optical system 103, the image pickup element 106 and the pupil plane 752 of the photographing optical system have a conjugate relation. Further, the object plane 751 and the MLA 220 have a conjugate relation. Therefore, the light which exits from the point 751a on the object reaches the micro lens 761, the light which exits from the point 751b reaches the micro lens 762, and the light which passes through the areas 231 to 235 reaches the corresponding pixels provided under the micro lenses, respectively.

In the example of FIG. 7B, the light from the photographing optical system 103 is focused by the MLA 220 and the image pickup element 106 is disposed on the image pickup plane. By arranging the micro lenses as mentioned above, the object plane 751 and the image pickup element 106 have a conjugate relation. The light which exits from the point 751a on the object and passes through the area 231 on the pupil plane reaches the micro lens 771. The light which exits from the point 751a on the object and passes through the area 233 on the pupil plane reaches the micro lens 772. The light which exits from the point 751b on the object and passed through the area 231 on the pupil plane reaches the micro lens 772, the light which exits from the point 751b on the object and passes through the area 233 on the pupil plane reaches the micro lens 773. The light which passes through each micro lens reaches the corresponding pixels provided under the micro lenses, respectively. As mentioned above, the points on the object are respectively focused to a different position of the image pickup element by the passed areas on the pupil plane. By rearranging those points onto the positions on the virtual image pickup element 106a, information similar to that in FIG. 7A can be obtained. That is, information of the passed pupil areas (angles of incidence) and the positions on the image pickup element can be obtained and the function as pupil division means is attained.

In the example of FIG. 7C, the light from the photographing optical system 103 is re-formed by the MLA 220 (since the light in a state where the light which is focused once is dispersed is focused, such a processing is called "re-formation") and the image pickup element 106 is disposed on the image pickup plane. By arranging the micro lenses as mentioned above, the object plane 751 and the image pickup element 106 have the conjugate relation. The light which exited from the point 751a on the object and passed through the area 231 on the pupil plane reaches the micro lens 782. The light which exits from the point 751a on the object and passes through the area 233 on the pupil plane reaches the micro lens 781. The light which exited from the point 751b on the object and passes through the area 231 on the pupil plane reaches the micro lens 784. The light which exits from the point 751b on the object and passed through the area 233 on the pupil plane reaches the micro lens 783. The light which passes through each micro lens reaches the corresponding pixels provided under the micro lenses, respectively. In a manner similar to FIG. 7B, by rearranging those points onto the positions on the virtual image pickup element 106a, information similar to that in FIG. 7A can be obtained. That is, the information of the passed pupil areas (angles of incidence) and the positions on the image pickup element can be obtained and the function as pupil division means is attained.

In FIGS. 7A to 7C, the example in which the MLA (phase modulation element) is used as pupil division means and the position information and the angle information can be obtained is shown. However, another optical construction can be also used so long as it can obtain the position information and the angle information (which are equivalent to that the passed pupil areas are restricted). For instance, a method whereby a mask (gain modulation element) to which a proper pattern is formed is inserted into an optical path of the photographing optical system can be also used.

Other Examples

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer or a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadcast interpolation so as to encompass all such modifications and equivalent structures and functions.

This application claims the benefit of Japanese Patent Application No. 2011-162090, filed Jul. 25, 2011, which is hereby incorporated by reference herein in its entirety.

The invention claimed is:

1. An image pickup apparatus comprising:
a sensor configured to output, with a single sensor exposure reading, images picked up at different angles of incidence based on different pupil areas; and a processor,
wherein the processor is configured to function as:
an image generation unit configured to generate a plurality of images of which imaging positions are mutually different by shifting the images outputted from the sensor relative to one another at each of a plurality of steps and combined per each of the shifted images at each of the plurality of the steps,
a contrast evaluation unit configured to calculate a plurality of contrast evaluation values of the images generated by the image generation unit of which imaging positions are different from each other in a focus adjusting direction, and
a decision unit configured to decide a best contrast evaluation value among the plurality of contrast evaluation values corresponding to a corresponding area among the images of which imaging positions are different from each other in the focus adjusting direction.

2. The image pickup apparatus according to claim 1, further comprising a plurality of micro lenses, each corresponding to a respective one of a plurality of photoelectric conversion areas of the sensor.

3. The image pickup apparatus according to claim 1, wherein the processor is further configured to function as a correlation calculation unit configured to calculate a correlation evaluation value between images outputted from the sensor.

4. The image pickup apparatus according to claim 3, wherein the correlation calculation unit calculates a difference between image data corresponding to selected different exit pupil areas among image data of the generated images, thereby calculating a phase difference between the images which pass through the different exit pupil areas.

5. The image pickup apparatus according to claim 1, wherein the processor is further configured to function as an in-focus position decision unit configured to decide an in-focus position of a photographing lens from the contrast evaluation values calculated by the contrast evaluation unit.

6. The image pickup apparatus according to claim 4, wherein the processor is further configured to function as an in-focus position decision unit configured to decide an in-focus position of a photographing lens from the contrast evaluation values calculated by the contrast evaluation unit and the phase difference.

7. The image pickup apparatus according to claim 1, further comprising a memory configured to store the images generated by the image generation unit, and a display for displaying the images stored in the memory.

8. An image pickup apparatus comprising:
a sensor for photoelectrically converting an optical image of an object which enters through a photographing lens and outputting an image signal, the sensor configured to output, with a single sensor exposure reading, images picked up at different angles of incidence based on different pupil areas; and
a processor,
wherein the processor is configured to function as:
a detection unit for detecting a phase difference between the images from a correlation between the images from the sensor,
an image generation unit configured to generate a plurality of images of which imaging positions are mutually different by shifting the images outputted from the sensor relative to one another at each of a plurality of steps and combined per each of the shifted images at each of the plurality of the steps,
wherein the plurality of images are generated by changing an image to be subjected to synthesization, among images derived based on signals from the sensor and corresponding to different pupil areas,
a contrast evaluation unit configured to calculate contrast evaluation values of the images generated by the image generation unit on the basis of a detection result of the phase difference, of which imaging positions are different from each other in a focus adjusting direction, and
a decision unit configured to decide a best contrast evaluation value among the plurality of contrast evaluation values corresponding to a corresponding area among the images of which imaging positions are different from each other in the focus adjusting direction.

9. The image pickup apparatus according to claim 8, further comprising a plurality of micro lenses, each corresponding to a respective one of a plurality of photoelectric conversion areas of the sensor,
wherein the plurality of micro lenses are arranged on a photosensing surface of the sensor and configured such that a plurality of pixels formed on a photosensing surface of the sensor is divided into a plurality of pixel groups corresponding to each micro lens, and each micro lens is configured such that each pixel of the corresponding pixel group corresponds to light from a different exit pupil area of the photographing lens.

10. A control method of an image pickup apparatus including a sensor for photoelectrically converting an optical image of an object which enters through a photographing lens and outputting an image signal, comprising:
an output step of, from the sensor, obtaining and outputting, with a single sensor exposure reading, images picked up at different angles of incidence based on different pupil areas;
an image generation step of generating a plurality of images of which imaging positions are mutually different by shifting the images outputted from the sensor relative to one another at each of a plurality of steps and combined per each of the shifted images at each of the plurality of the steps, wherein the plurality of images are generated by changing an image to be subjected to synthesization, among images derived based on signals from the sensor and corresponding to different pupil areas;
a contrast evaluation step of a plurality of contrast evaluation values of the images generated by the image generation step in which imaging positions are different from each other in a focus adjusting direction; and
a decision step of deciding a best contrast evaluation value among the plurality of contrast evaluation values corresponding to a corresponding area among the images of which imaging positions are different from each other in the focus adjusting direction.

11. A control method of an image pickup apparatus including a sensor for photoelectrically converting an optical image of an object which enters through a photographing lens and outputting an image signal, comprising:
an output step of, from the sensor, obtaining and outputting, with a single sensor exposure reading, images picked up at different angles of incidence based on different pupil areas;
a detection step of detecting a phase difference between the images from a correlation between the images obtained from the sensor;

an image generation step of generating a plurality of images of which imaging positions are mutually different by shifting and combining the images outputted from the sensor relative to one another at each of a plurality of steps and combined per each of the shifted images at each of the plurality of the steps, wherein the plurality of images are generated by changing an image to be subjected to synthesization, among images derived based on signals from the sensor and corresponding to different pupil areas;

a contrast evaluation step of calculating a plurality of contrast evaluation values of the images generated by the image generation step, on the basis of a detection result of the phase difference, in which imaging positions are different from each other in a focus adjusting direction; and a decision step of deciding a best contrast evaluation value among the plurality of contrast evaluation values corresponding to a corresponding area among the images of which imaging positions are different from each other in the focus adjusting direction.

12. A non-transitory computer-readable storage medium storing a program comprising a program code for causing a computer to execute a control method of the image pickup apparatus according to claim 10.

13. A non-transitory computer-readable storage medium storing a program comprising a program code for causing a computer to execute a control method of the image pickup apparatus according to claim 11.

* * * * *